INVENTORS
RODERICK J. WHELAN
& ROBERT A. REICH
BY Bosworth & Sessions
ATTORNEYS

Patented Sept. 2, 1947

2,426,653

UNITED STATES PATENT OFFICE 2,426,653

BRAZING NUT AND BOLT

Roderick J. Whelan and Robert A. Reich, Berea, Ohio, assignors to The Ohio Nut & Bolt Company, Berea, Ohio, a corporation of Ohio Application August 17, 1944, Serial No. 549,826

3 Claims. (Cl. 85—32)

1

This invention relates to securing devices and more particularly to nuts, bolts, screws, studs, and the like which are used for securing other members to sheet metal or other generally flat metallic surfaces.

Large quantities of such devices are used, for example, in the manufacture of automobile bodies, refrigerators, stoves and the like, but heretofore it has been the practice either to clinch or to weld the devices to the sheet metal structure. These methods of attachment, and particularly the welding, have been satisfactory, but require special equipment on the part of the user, so that in many instances the use of weld nuts and clinch nuts cannot be economically justified. According to the present invention, we provide securing devices of this general character, but which are arranged so that they can be readily brazed or silver soldered to the supporting sheet, plate or other structure. The devices of the present invention require only the application of heat, as by a simple blow torch or by resistance-brazing equipment where that is available, and have many useful applications.

A general object of our invention is the provision of securing devices such as nuts, bolts, studs, grommets and the like which can readily be brazed to supporting sheets, plates and the like to provide means for attaching other parts thereto. Another object is to provide such devices, as articles of manufacture, in which the brazing or soldering material is secured to the devices themselves when they are furnished to the user. Another object is the provision of such devices in which both the brazing material or solder and the required flux are secured to the devices when they are furnished to the user, so that the user need only correctly position the securing devices on the sheet, plate or the like and apply heat thereto in order to securely braze or solder them to the underlying surface. Another object is the provision of a method of making securing devices of the character noted above.

Figure 1:
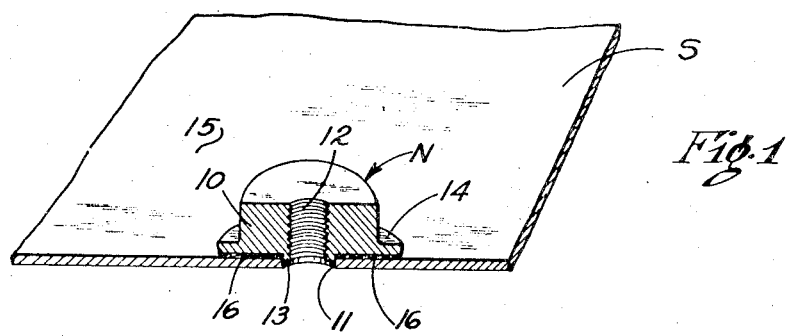
Figure 2:
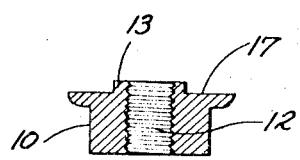
Figure 3:
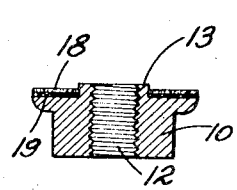
Figure 4:
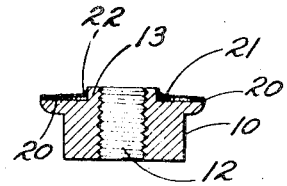
Figure 5:
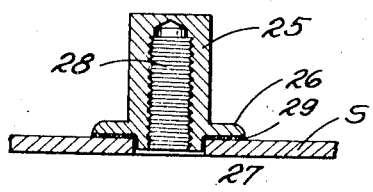
Figure 6:
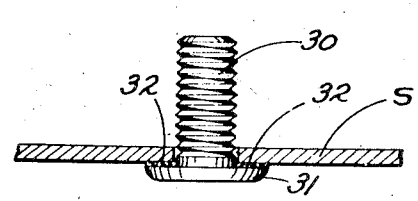

Further objects and advantages of our invention will become apparent from the following description of various forms thereof, reference being made to the accompanying drawings wherein Figure 1 is a perspective, partly in section, showing a brazing nut made according to our invention secured to a plate; Figure 2 shows the brazing nut of Figure 1 at one stage of the manufacturing operation; Figure 3 shows the nut at a later stage; Figure 4 shows the completed brazing nut as furnished to the user and ready for use; Figures 5 and 6 are sectional views

Figure 7:
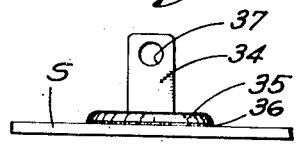
Figure 8:
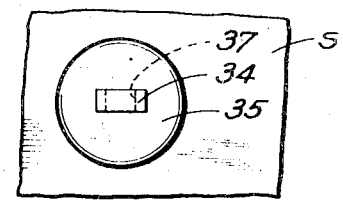
Figure 9:
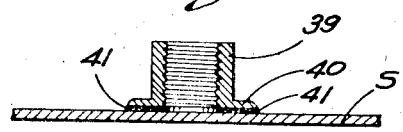
Figure 10:
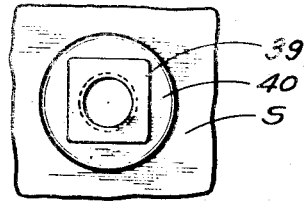

2 illustrating modified forms of securing devices; Figure 7 is an elevation of a further modification; Figure 8 is a plan view of the form shown in Figure 7; Figure 9 is a sectional view of another modified form of brazing nut; and Figure 10 is a plan view of a nut shown in Figure 9.

While our securing devices may be secured to metal parts of any thickness and with flat or curved surfaces, one extensive application of our invention is as a means for providing thin sheet metal parts with threaded openings. A simple form of nut for accomplishing this purpose is shown at N, Figure 1, as secured to a sheet S. The sheet may comprise a light gage steel sheet or plate or other generally flat surface and is provided with an opening 11 with which the nut registers. The nut may be composed of steel or other suitable material and preferably comprises a body portion 10 having a threaded bore 12 terminating in a pilot 13 which is adapted to enter the opening 11 in the sheet to center the nut with respect to the opening, and a lateral flange 14 which is provided for the purpose of giving a greater area of contact between the nut 10 and the upper surface 15 of the plate S. The contacting surfaces of the nut and plate are brazed or soldered together, preferably by silver solder, the solder connection being indicated diagrammatically at 16. With such an arrangement, a properly soldered connection secures the nut to the sheet with such strength that a light gage sheet will be torn or otherwise damaged before the bond between the nut and the sheet is destroyed.

As noted above, according to our invention, nuts are supplied to the user preferably with the brazing metal or solder and flux secured thereto so that the user need only properly position the nut on the sheet to which it is to be secured and apply heat thereto, preferably with either a torch or by an electric resistance heater which in essence is very similar to a conventional spot welding machine. Upon heating and subsequent cooling, the nut will be properly secured to the sheet. According to our preferred method we produce such nuts by first manufacturing the body portions shown in Figure 2, preferably by up-setting operations although they also can be manufactured on automatic screw machines. Then the flat surface 17 of the body portion is coated with a suitable flux, and a disk or washer 18 of brazing metal placed over the pilot 13. This assembly is indicated in Figure 3, the flux being indicated diagrammatically at 19. Preferably, the brazing metal consists of a suitable silver solder. Such solders are well known in the art and readily available on the market, the composition of solders suitable for various purposes being set forth in the "Welding Handbook" 1938 edition, published by American Welding Society, New York in chapter 18A, page 336. For most purposes, particularly when brazing ferrous materials, we preferably employ a solder such as grade 12 of the table on page 336 of the handbook, and consisting of about 50% silver, 15.5% copper, 16.5% zinc and 18% cadmium.

With silver solders, the ordinary practice is to employ fluxes such as described on page 340 of the "Welding Handbook." We preferably employ a flux of the borax and fluoride type, the term "borax" being used herein to include potassium tetraborate as well as sodium tetraborate. A preferred flux composition consists of about 25% potassium acid fluoride ($KHF_2$), about 60% potassium tetraborate ($K_2B_4O_7.5H_2O$) and the balance water, the water giving the flux a pasty consistency so that it can be applied to the surfaces as by brushing.

We have discovered that when a small amount of such a borax and fluoride paste, together with a thin disk of silver solder or other suitable brazing metal, is applied to the nut as shown in Figure 3, and the assembly heated to a temperature sufficient to melt the solder, the solder is firmly bonded to the surface 17 and a substantial portion of the previously pasty flux remains on the surface of the solder as a relatively hard glassy film. This result is shown in Figure 4 where the fused and adherent brazing metal is indicated at 20 and the glassy flux coating overlying the brazing metal is indicated at 21. During the operation of fusing the silver solder, which requires temperatures of from 1175° to 1600° F. depending upon the composition of the solder employed, the water incorporated in the flux and combined with the potassium tetraborate is driven off together with a small amount of hydrogen fluoride. The remaining glassy coating which is present when the metal has been fused and cooled appears probably to consist of potassium fluoride (KF) and anhydrous potassium tetraborate ($K_2B_4O_7$) in the proportions of about 25% potassium fluoride and 75% potassium tetraborate.

This glassy coating adheres quite strongly to the underlying solder, with the result that the nuts, with the brazing metal bonded thereto and the fused flux overlying the brazing metal, can be shipped and handled without danger of dislodging the flux. The fused, glassy flux is not corrosive and functions very satisfactorily in the subsequent operation of securing the nuts in final position. Furthermore, on subsequent heating there appears to be no hydrogen fluoride given off by the flux. The elimination of this poisonous gas in the first fusing operation is advantageous for there thus is no serious health hazard to the users of the nuts, and the gas can be disposed of safely in the factory where the brazing metal and flux are initially applied to the nuts. Other borax fluxes may be employed, and sodium salts may be employed instead of potassium salts. However, we find that a flux of the composition given above is very satisfactory.

The operation of initially fusing the solder and flux to produce the article shown in Figure 4 is preferably carried out in a continuous furnace having a non-oxidizing or reducing atmosphere, the nuts being positioned in the furnace with the surfaces 17 up and substantially horizontal. When such a furnace is employed the parts come out bright and clean and the operation can be carried out rapidly and economically. As noted above the brazing metal is preferably supplied in the form of washers made of thin foil preferably having a thickness of from about 0.002" to about 0.005", depending upon the amount of metal required. However, the metal may be supplied in other forms if desired. For example, chips, filings or wire rings may be employed. The fusing of the metal in the furnace results in a sufficiently uniform distribution of the metal coating on the surface 17, regardless of how the metal is originally supplied.

Ordinarily the metal coating on the nut will be somewhat thicker in the vicinity of the pilot, capillary action causing the formation of a fillet as indicated at 22. The presence of this fillet gives assurance that there will be sufficient brazing metal disposed adjacent the opening in the sheet to braze the pilot 13 to the walls of the opening, but preferably the length of the pilot is greater than the thickness of the layers of solder and flux so that it projects beyond the flux layer. The pilot thus will function properly to locate the nut in the opening in the sheet, and when the solder is fused, the layer of solder will become of substantially uniform thickness throughout, as indicated at 16 in Figure 1.

Securing devices of various other types may be made according to our invention. For example, in Figure 5 we have illustrated a nut or grommet secured to the sheet S and having a cylindrical body portion 25 provided with a cylindrical flange 26 and a pilot 27 adapted to enter an opening in the sheet S as shown. Here the threaded opening 28 does not go all the way through the body portion 25 but is stopped short as shown in the drawing. This device provides a threaded recess in the sheet S which is adapted to receive a screw, for example. The device is preferably secured to the sheet S in the manner previously described by solder indicated diagrammatically at 28.

Figure 6 shows a brazing bolt or stud embodying our invention. The bolt comprises a threaded body or shank 30, and a round flat head 31 providing a surface adapted to be brazed to the sheet S as indicated diagrammatically at 32.

Figures 7 and 8 show a form of our invention comprising a body portion 34 of rectangular cross section and a flat circular head portion 35 in engagement with the sheet S and secured thereto by the brazing metal indicated diagrammatically at 36. The body portion 34 is provided with an opening 37, the axis of which is substantially parallel to the surface of the sheet S. Devices of this character are useful to support hooks, wires, rods and the like. Obviously various other forms of bodies may be designed for other specific purposes.

Figures 9 and 10 show a brazing nut which differs from the modification shown in Figures 1 to 4, principally in that no pilot is provided. The body portion 39 of this nut is also angular in cross section as shown to provide for engagement with a wrench. The body portion preferably terminates in a flange 40 which provides an adequate surface for brazing to the sheet S as indicated diagrammatically at 41. Inasmuch as the under surface of the nut is plane because of the absence of the pilot, nuts of this character can be secured to a sheet as shown without requiring any opening through the sheet.

From the foregoing description of various forms of our invention, it will be evident that we have provided securing devices such as nuts, bolts, studs, grommets and the like which can be readily brazed to supporting sheets and which require a minimum of equipment and skill for carrying out the brazing operation. Our securing devices preferably are supplied to the users with the brazing metal and flux carried by the devices themselves so that the devices may be brazed in position merely by placing them against the supporting surface to which they are to be secured and then heating them to fuse the solder or other brazing metal. The devices may be accurately located with respect to the supporting surfaces by means of pilots, and adequate areas of contact are provided to insure the production of strong connections. While we have illustrated our devices as secured to thin, flat sheets, it is to be understood that they may be secured to curved or angular surfaces by providing the devices with surfaces which substantially conform to the surfaces of the articles to which they are to be secured. Also, our devices may be secured to materials of any thickness, whereas clinch nuts and welding nuts are useful, in general, only with relatively thin materials. By our method the devices may be manufactured rapidly and economically.

Various changes and modifications may be made in our invention without departing from the spirit and scope thereof. It is therefore to be understood that our patent is not limited to the preferred embodiments described herein or in any manner other than by the scope of the appended claims.

We claim:

1. As an article of commerce, a brazing nut, screw, bolt, stud, grommet or the like comprising a body portion having a surface shaped to conform to another member, a layer of brazing metal fused to said surface, and a solidified glassy layer of flux fused upon and overlying said brazing metal.

2. As an article of commerce, a brazing nut comprising a body portion having a threaded opening therein and having a flat surface at one end thereof, a pilot projecting from said surface and surrounding said opening, a layer of brazing metal fused to said surface, and a coating of solidified glassy flux fused upon said brazing metal, the total thickness of said layer of brazing metal and said coating of flux being less than the length of said pilot.

3. The method of making a nut, bolt, screw, stud, grommet or the like having adherent coatings of brazing metal and flux thereon and adapted to be brazed to another member without requiring the addition of flux at the time of brazing, including the steps of forming the article with a surface shaped to conform to such other member, coating such surface with a flux containing borax, supplying brazing metal to such surface, heating the assembly to fuse the brazing metal and the flux, permitting the assembly to cool and solidifying the brazing metal and the flux remaining after the heating operation, whereby the brazing metal is fused to said surface and the outer surface of the brazing metal is provided with a fused adherent glassy coating of flux.

RODERICK J. WHELAN.
ROBERT A. REICH.

REFERENCES CITED

The following references are of record in the file of this patent:

UNITED STATES PATENTS

| Number | Name | Date |
| --- | --- | --- |
| 1,717,250 | Phelan | June 11, 1929 |
| 242,649 | Howes | June 7, 1881 |
| 1,161,944 | Maddy | Nov. 30, 1915 |
| 2,054,187 | Almdale | Sept. 15, 1936 |
| 1,883,906 | Hasselquist | Oct. 25, 1932 |
| 185,339 | Mackey | Dec. 12, 1876 |
| 997,420 | Seng | July 11, 1911 |

OTHER REFERENCES

Application Use & Control of Silver Solder, Steel, Mar. 13, 1944.

Sil-Fos and Easy Flo. Bulletin 12, published by Hardy & Harman, N. Y. C.